July 18, 1961
J. G. GALE
2,992,465
SAFETY SLING HOOK
Filed Aug. 24, 1959
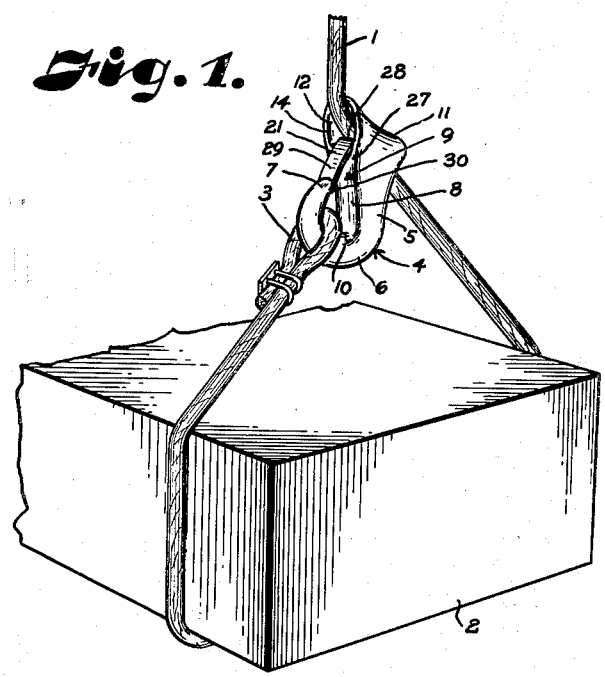
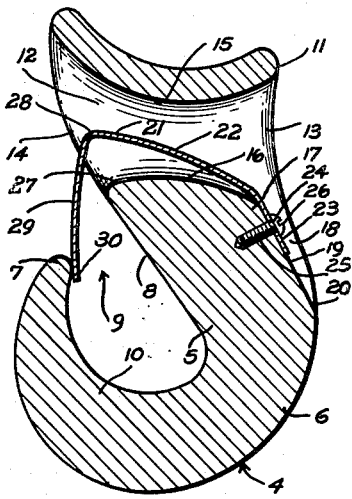
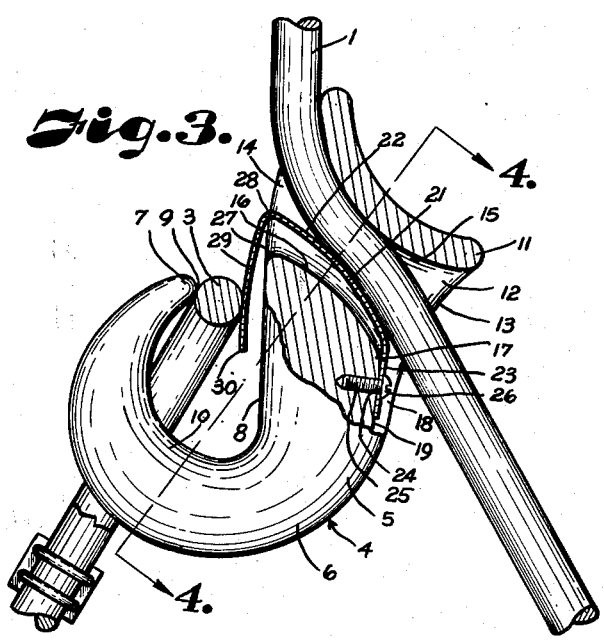
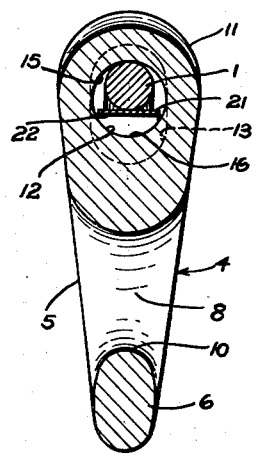
INVENTOR.
James G. Gale.
BY
*Frichtown and Gold*
ATTORNEYS.

United States Patent Office 2,992,465
Patented July 18, 1961

2,992,465
SAFETY SLING HOOK
James G. Gale, Kansas City, Mo., assignor to Newco Manufacturing Company, Inc., Kansas City, Mo., a corporation of Missouri
Filed Aug. 24, 1959, Ser. No. 835,550
5 Claims. (Cl. 24—73)

This invention relates to rope fittings, and more particularly to a type of fitting commonly referred to as "sliding hook," "sling hook" and "choker hook" wherein the hook is sleeved on a hauling or lifting rope line and adapted to be engaged with an eye or the like on the free end of the line when passed around a load to form a slip loop connection with said load that is rapidly adjustable to various size loads.

Conventional sliding or choker sling hooks have a hook at one end of a body and a passage through the other end to receive a rope or cable whereby the hook is freely slidable on the rope. Such hooks tend to slide down to the end of the rope whereby it is necessary to raise the hook as the line is placed around a load, and the manipulations frequently required to move the load and/or hook to position and hold the hook during application of the rope to the load may result in injuries to the workers. Also, in some applications the eye or rope fitting engaged with the hook may be displaced therefrom by movement through the open way between the hook nose and body.

The principal objects of the present invention are to provide a safety sling hook that will eliminate the aforementioned difficulties; to provide an improved sling or choker hook structure with resilient frictional engagement with the rope threaded through the passage therein and a resilient keeper normally closing the way between the hook nose and body whereby the rope is frictionally gripped in the passage to prevent gravitational slippage on the rope; to provide a safety sling hook with a resilient frictional rope engaging member in which the gripping surfaces do not distort the rope and in which the keeper portion does not materially obstruct the way between the nose and body when in way opening position; to provide such a sling hook wherein the resilient frictional member has such frictional grip on the rope in the passage to hold the hook against gravity sliding on the rope but will permit said hook to slide when moved manually or placed under load.

Other objects and advantages of this invention will become apparent from the following description taken in connection with the accompanying drawings wherein are set forth by way of illustration and example certain embodiments of this invention.

FIG. 1 is a perspective view of a safety sling hook on a cargo sling extended around a load to be lifted.

FIG. 2 is a longitudinal sectional view of a sling hook illustrating the resilient frictional grip structure.

FIG. 3 is a side elevation of the safety sling hook with portions broken away to illustrate the grip structure with the keeper moved to way opening position for insertion or removal of the rope from engagement with the hook member.

FIG. 4 is a transverse sectional view through the safety sling hook on the line 4—4, FIG. 3.

Referring more in detail to the drawings:

1 designates a rope or cable having one end (not shown) suitably arranged for connection with a hook or other lifting or hauling device. The rope 1 forms a part of a sling or other rope member adapted to be connected with or disposed in embracing relation to a load 2 such as a box, pipe or other suitable cargo. The free end of the rope 1 is preferably provided with a loop or eye 3 adapted to be connected with a safety sling hook 4 embodying the features of the present invention and mounted for sliding movement on the rope 1.

The sling hook structure 4 includes a body member 5 provided at one end with a portion formed in a return bend 6 terminating in a hook nose or point 7 spaced from the surface 8 of the body to define a rope passage or way 9 whereby the reverse bend forms a hook portion 10 that is preferably progressively larger in size from the nose 7 to substantially the opposite base or shank end 11 of the body 5. The enlarged base portion or shank end 11 of the body is widened and thickened and is provided with a through passage 12 whereby said shank end 11 is in the form of a sleeve. The opposite ends 13 and 14 of the passage 12 are flared outwardly and the outer side 15 of the passage remote from the hook is substantially arcuate in shape, curved in the same direction as the hook and is of suitable length whereby when the rope 1 is engaged therewith the rope is not subjected to excessively sharp bends in lifting a load. The inner side 16 of the passage 12 is substantially arcuate in shape, the curvature being opposite to that of the side 15. The side 16 terminates as at end 17 at the rear of the shank with respect to the hook nose 7 and an elongate recess 18 extends into the body from the rear of the shank portion and preferably has a flat bottom face 19 extending from the end 17 of the inner side 16 toward the bend 6 of the body member, said bottom face 19 sloping outwardly and terminating at the rear face of the body as at 20. The recess 18 is preferably of a width slightly less than the width of the passage 12 intermediate the ends 13 and 14 thereof, said width of the passage 12 being slightly larger than the diameter of the rope 1 for free movement of the rope through the passage. The passage 12 is preferably slightly oval-shaped with the long diameter thereof longitudinally of the body 5, and a resilient frictional gripping member 21 is arranged in the passage to grip the rope between the gripping member and the side 15 of the passage.

In the illustrated structure, the gripping member 21 is formed of flat spring metal with an arcuate gripping bar portion 22 curved in the same direction as the side 16 of the passage and terminating at one end in a flat anchoring portion or member 23 extending downwardly along and engaged with the face 19 of the recess 18. The spring is preferably of the same width as the recess 18 to fit therein and the portion 23 has an aperture 24 aligned with a threaded bore 25 extending into the body with a suitable fastening device such as a screw 26 extending through the aperture 24 and threaded into the threaded bore 25 to secure the end portion 23 to the body of the hook. The other end portion of the gripping bar 22 extends beyond the opposite end 27 of the side 16, as illustrated in FIG. 2, and terminates in a bend 28 toward the hook nose 7 to provide a keeper bar portion 29 which has its free end 30 extending into the way 9 and normally resiliently engaged with the hook nose 7 to close said way. The resilient member 21 is shaped and positioned whereby when the end portion 23 is secured to the body member 5 the end portion 30 of the keeper bar is engaged with the hook nose 7 and the gripping bar portion is spaced from the side 16 of the passage 12 and has a spacing from the side 15 of said passage substantially less than the diameter of the rope 1, and when a rope is threaded through the passage 12 said rope is gripped sufficiently between the bar portion 22 and the side 15 of the passage to support approximately twice the weight of the safety sling hook. The resilient gripping member presses the rope toward the side 15 to provide a grip whereby the rope may be drawn therethrough by applying opposite forces to the rope and hook to position the hook as desired on the rope, and when left unattended the hook will remain in the selected position, and under load the hook will be automatically pulled down toward the load to tighten the sling thereon. With the rope in the passage 12 and gripped by the gripping member 21, the keeper bar portion 29 may be pressed toward the surface 8 of the body to open the way 9 as, for example, by pressing an eye 3 against said keeper member as illustrated in FIG. 3. The bar portion 29 of the keeper is relatively thin whereby it does not materially reduce the width of the way and permits easy application or disengagement of the eye from the hook when the keeper bar 29 is pressed toward the face 8 of the body.

In assembling a safety sling hook constructed as described, the frictional grip member 21 is placed in the passage 12 with the end 30 of the keeper bar portion 29 engaged with the hook nose 7, and the flat end 28 engaged with the surface 19 of the recess 18, and then the screw 26 is applied to anchor the grip member and keeper in place. In making a sling, an eye or loop 3 is formed thereon at one end and the opposite end is threaded through the pasage 12 by inserting said end into the end 13 of the passage and moving same through toward the end 14. Said opposite end of the rope is then suitably formed to provide a loop or other fitting for connection with a lifting mechanism. When it is desired to lift a load, the sling hook 4 is grasped and slid upwardly on the rope 1 substantially above any portion that will be engaged with the load to be lifted. Then the free end of the rope with the eye 3 thereon is placed under the load and moved upwardly on the opposite side, and then the eye is moved into engagement with the keeper bar 29 and pressed to move same to way opening position whereby the eye will pass through the way and be engaged with the hook portion 10. Lifting force is then applied to the line 1 to cause the hook to slide downwardly for tightening of the sling on the load, after which the load may be moved as desired. When the load is lowered and the rope slackened, the eye 3 will remain engaged with the hook. When it is desired to remove the sling from the load, the hook member is grasped to slide same on the rope, and then the keeper bar 29 is pressed toward the face 8 of the hook body to open the way whereby the eye may be disengaged from the hook.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A sling hook structure comprising, a body having an enlarged base portion at one end with a passage therethrough adapted to receive a rope threaded therethrough, a hook on the other end of said body terminating in a nose spaced from the body to define a way therebetween, an elongate resilient gripping member in the passage and extending longitudinally thereof and having an end on the resilient gripping member secured to the body adjacent the end of the passage remote from the hook nose, said resilient gripping member having a portion in the passage normally spaced from the opposite side of the passage a distance less than the diameter of the rope whereby a rope extending through the passage is frictionally engaged by said portion of the resilient gripping member and said opposite side of the passage and resiliently clamped therebetween to hold the hook structure against free slippage on the rope, and an extension on the other end of the resilient gripping member extending from the other end of the passage toward said hook nose in spaced relation to the body to form a keeper normally restricting said way and permitting passage of a rope member through the way only when said extension is moved toward the body to open the way.

2. A sling hook structure comprising, a body having an enlarged base portion at one end with a passage therethrough adapted to receive a rope threaded therethrough, a hook on the other end of said body terminating in a nose spaced from the body to define a way therebetween, said passage being flared at each end thereof with the side of said passage opposite the hook curved in the same direction as said hook, an elongate resilient gripping member in the passage and extending longitudinally thereof, an end on the resilient gripping member secured to the body adjacent the end of the passage remote from the hook nose, said resilient gripping member being inclined from said end toward the opposite side of the passage whereby said resilient gripping member has a portion in the passage normally spaced from said opposite side of the passage a distance less than the diameter of the rope whereby a rope extending through the passage is frictionally engaged by said portion of the resilient gripping member and said opposite side of the passage and resiliently clamped therebetween to hold the hook structure against free slippage on the rope, and a flat resilient extension on the other end of the resilient gripping member extending from the other end of the passage toward said hook nose in spaced relation to the body to form a keeper normally restricting said way and permitting passage of a rope member through the way only when said extension is moved toward the body to open the way.

3. A sling hook structure comprising, a body having an enlarged base portion at one end with a passage therethrough adapted to receive a rope threaded therethrough, a hook on the other end of said body terminating in a nose spaced from the body to define a way therebetween, said passage being flared at each end thereof with the side of said passage opposite the hook curved in the same direction as said hook, an elongate flat spring gripping member in the passage and extending longitudinally thereof, said body having a recess therein adjacent the end of the passage remote from the hook nose, an end on the flat spring engaged with the body in said recess, means securing said end of the flat spring to said body, said flat spring being inclined from said end toward the opposite side of the passage and crowned toward said opposite side whereby the intermediate portion of the flat spring in the passage is normally spaced from said opposite side of the passage a distance less than the diameter of the rope whereby a rope extending through the passage is frictionally engaged by said portion of the flat spring gripping member and said opposite side of the passage and resiliently clamped therebetween to hold the hook structure against free slippage on the rope, and an extension on the other end of the flat spring gripping member extending from the other end of the passage and resiliently engaging said hook nose to form a keeper normally closing said way and permitting passage of a rope member through the way only when said extension is moved toward the body to the open the way.

4. A sling hook structure comprising, a body having an enlarged base portion at one end with a passage therethrough adapted to receive a rope threaded therethrough, a hook on the other end of said body terminating in a nose spaced from the body to define a way therebetween, an elongate resilient gripping member in the passage and extending longitudinally thereof and having an end secured to the body adjacent one end of the passage remote from the hook nose, and an extension on the other end of said resilient gripping member extending across said way and resiliently engaging said hook nose to normally close said way and permit passage of a rope member therethrough only when said extension is moved toward the body to open said way, the portion of the resilient gripping member in the passage being inclined toward the opposite side of the passage with the intermediate portion of said resilient gripping member normally spaced from said opposite side of the passage a distance less than the diameter of the rope whereby the rope extending through the passage is frictionally engaged by the intermediate portion of said resilient gripping member and said opposite side of the passage and resiliently clamped therebetween to hold the hook structure against free slippage on the rope.

5. A sling hook structure comprising, a body having an enlarged base portion at one end with a passage therethrough adapted to receive a rope threaded therethrough, a hook on the other end of said body terminating in a nose spaced from the body to define a way therebetween, said passage being flared at each end thereof with the side of said passage opposite the hook curved in the same direction as said hook, an elongate flat spring in the passage and extending longitudinally thereof and having an end secured to the body adjacent one end of the passage remote from the hook nose, and an extension on the other end of said flat spring extending from the other end of said passage across said way and resiliently engaging said hook nose to normally close said way and permit passage of a rope member therethrough only when said extension is moved toward the body to open said way, the portion of the flat spring gripping member in the passage being crowned and extending toward the opposite side of the passage with the intermediate portion of said flat spring normally spaced from said opposite side of the passage a distance less than the diameter of the rope whereby the rope extending through the passage is frictionally engaged by the intermediate portion of said flat spring and said opposite side of the passage and resiliently clamped therebetween to hold the hook structure against free slippage on the rope.

References Cited in the file of this patent

UNITED STATES PATENTS

| | | |
|---|---|---|
| 622,770 | Jones | Apr. 11, 1899 |
| 707,241 | Knapp | Aug. 19, 1902 |
| 1,882,167 | Thirlwell | Oct. 11, 1932 |
| 2,284,197 | Greene | May 26, 1942 |
| 2,357,478 | Koch | Sept. 5, 1944 |
| 2,381,531 | Ehmann | Aug. 7, 1945 |
| 2,465,132 | Surface | Mar. 22, 1949 |
| 2,867,026 | Gale | Jan. 6, 1959 |

FOREIGN PATENTS

| | | |
|---|---|---|
| 4,821 | Great Britain | Feb. 27, 1904 |